United States Patent
Aldereguia et al.

(10) Patent No.: US 7,485,809 B2
(45) Date of Patent: *Feb. 3, 2009

(54) SYSTEM AND METHOD FOR IMPLEMENTING A CABLE SYSTEM

(75) Inventors: Alfredo Aldereguia, Cary, NC (US); Grace A. Richter, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 728 days.

This patent is subject to a terminal disclaimer.

(21) Appl. No.: 11/100,680

(22) Filed: Apr. 6, 2005

(65) Prior Publication Data

US 2006/0230424 A1    Oct. 12, 2006

(51) Int. Cl.
*H01R 4/00* (2006.01)
(52) U.S. Cl. .................................. 174/84 R
(58) Field of Classification Search ............ 174/36, 174/110 R, 113 R, 74 R, 78; 340/815.45, 340/817.47; 439/490
See application file for complete search history.

(56) References Cited

U.S. PATENT DOCUMENTS

| | | | | |
|---|---|---|---|---|
| 4,890,102 A | * | 12/1989 | Oliver | 714/712 |
| 4,978,317 A | * | 12/1990 | Pocrass | 439/490 |
| 5,081,627 A | * | 1/1992 | Yu | 714/46 |
| 5,198,664 A | * | 3/1993 | Fayfield | 250/239 |
| 5,249,183 A | * | 9/1993 | Wong et al. | 370/228 |
| 5,281,148 A | | 1/1994 | Thompson | |
| 5,406,199 A | | 4/1995 | Shah | |
| 5,709,576 A | | 1/1998 | Lippmann et al. | |
| 5,741,152 A | * | 4/1998 | Boutros | 439/490 |
| 5,764,043 A | * | 6/1998 | Czosnowski et al. | 324/66 |
| 6,376,263 B1 | | 4/2002 | Franz | |
| 6,577,243 B1 | * | 6/2003 | Dannenmann et al. | 340/815.45 |
| 7,038,135 B1 | * | 5/2006 | Chan et al. | 174/84 R |

* cited by examiner

*Primary Examiner*—William H Mayo, III
(74) *Attorney, Agent, or Firm*—Sewyer Law Group LLP

(57) ABSTRACT

A system and method for implementing a cable system is disclosed. The system includes a paddle card system that includes a card, and a circuit coupled to the card and configured to couple to a server system node. The circuit indicates when the card is properly seated when the card is plugged into the server system node. As a result, errors due to the paddle card system being improperly seated are minimized.

13 Claims, 3 Drawing Sheets

SYSTEM AND METHOD FOR IMPLEMENTING A CABLE SYSTEM

FIELD OF THE INVENTION

The present invention relates generally to cables, and more particularly to a system and method for implementing a cable system.

BACKGROUND OF THE INVENTION

Cables are well known and are used to connect multiple components such as server nodes in a server system. The cables are often identical, and the number of cables can vary. For example, in some server systems, there may be as few as 3 identical cables or as many as 12 identical cables, depending on the server system configuration.

FIG. 1 is a block diagram of a conventional cable system 50. The cable system 50 includes a cable 52, a paddle card 60 coupled to one end of the cable 52, and a paddle card 62 coupled to the other end of the cable 52. The cable 52 includes a bundle of N wires 64. Connection pins 66 are coupled to one end of the wires 64, and connection pins 68 are coupled to the other end of the wires 64. Gaskets 70 and 72 are coupled to the paddle cards 60 and 62, respectively. The paddle cards 60 and 62 are plugged into respective server system nodes 80 and 82 of a server system.

A problem with the conventional cable system 50 is that if the paddle cards 60 and 62 are not properly connected or "seated" when plugged into the server system nodes 80 and 82, the overall server system may not be fully functional. Accordingly, for a fully functional server system, proper care must be taken to ensure that the paddle cards 60 and 62 are seated properly.

Another problem with the conventional cable system 50 is that the thickness of the gaskets 64 and 66 may vary sufficiently such that the paddle cards 60 and 62 may feel as though are properly seated when they are, in fact, not seated properly.

Determining if the paddle cards 60 and 62 are seated properly is difficult, because the server system may still work even if the paddle cards 60 and 62 are not seated properly. In this case, the server system would have degraded performance. This of course would be problematic, especially if the degraded performance goes unnoticed.

Cyclical redundancy check (CRC) errors may indicate degraded performance. However, trouble shooting a server system to isolate one or more cables as the root cause of the degraded performance may be time consuming. For example, a high number of CRC errors may indicate a possible problem with the cable 52 or the paddle card 60 and 62, but one would not be able to determine if the problem is simply caused by an improper seating of the paddle cards 60 and 62. Furthermore, if one or more of the paddle cards 60 and 62 are not seated properly, the improper seating may not cause enough errors for the server system to issue any warning. Yet, the degraded performance may still exist.

Accordingly, what is needed is a system and method for assuring that cables for server systems are seated properly. The system and method should be simple, cost effective, and capable of being easily adapted to existing technology. The present invention addresses such a need.

SUMMARY OF THE INVENTION

A system and method for implementing a cable system is disclosed. The system includes a paddle card system that includes a card, and a circuit coupled to the card and configured to couple to a server system node. The circuit indicates when the card is properly seated when the card is plugged into the server system node. As a result, errors due to the paddle card system being improperly seated are minimized.

DETAILED DESCRIPTION OF THE INVENTION

The present invention relates to cables and more specifically to a system and method for implementing a cable system. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

A system and method in accordance with the present invention for determining if a paddle card is properly seated in a server system are disclosed. The system provides a paddle card coupled to one end of a cable and a paddle card coupled to the other end of the cable. The paddle cards are coupled to light emitting diodes (LEDs) that light up to indicate that the paddle cards are properly seated in a server system. As a result, errors due to the paddle cards being improperly seated are minimized. To more particularly describe the features of the present invention, refer now to the following description in conjunction with the accompanying figures.

Although the present invention disclosed herein is described in the context of server systems, the present invention may apply to other types of systems, and still remain within the spirit and scope of the present invention.

Figure 1:
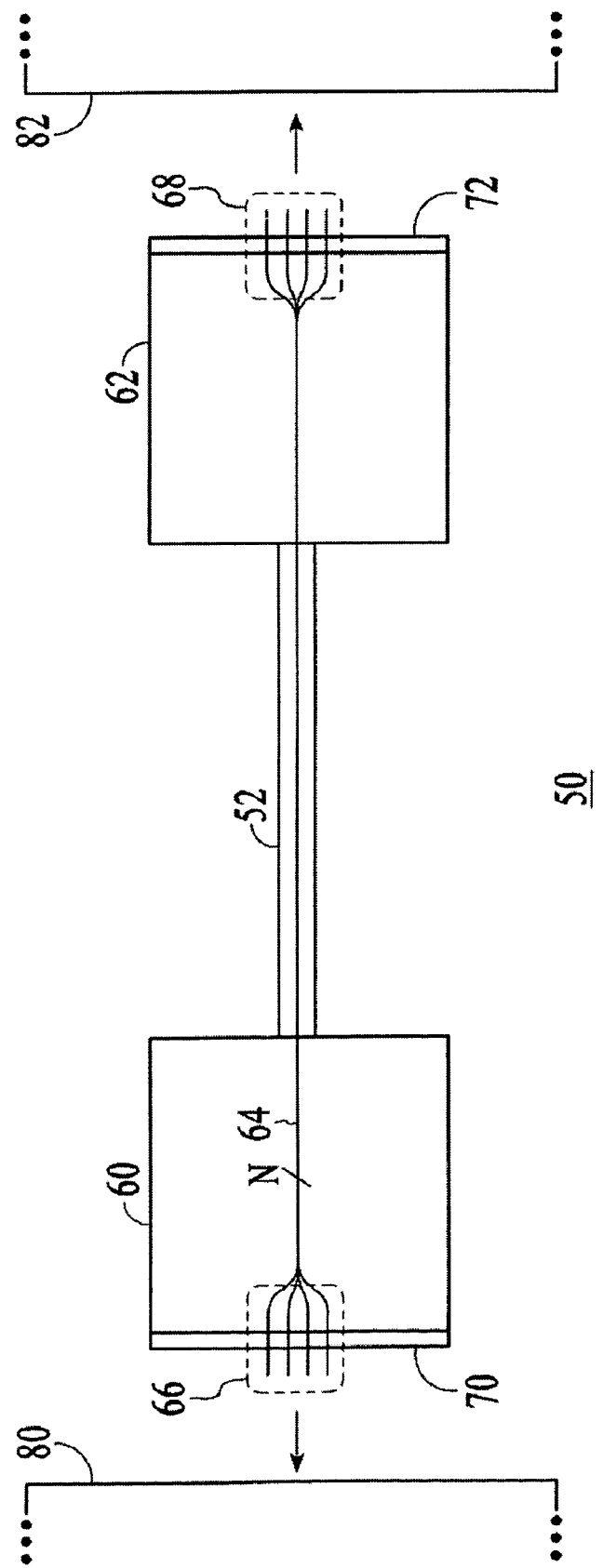
FIG. 1 is a block diagram of a conventional cable system.
Figure 2:
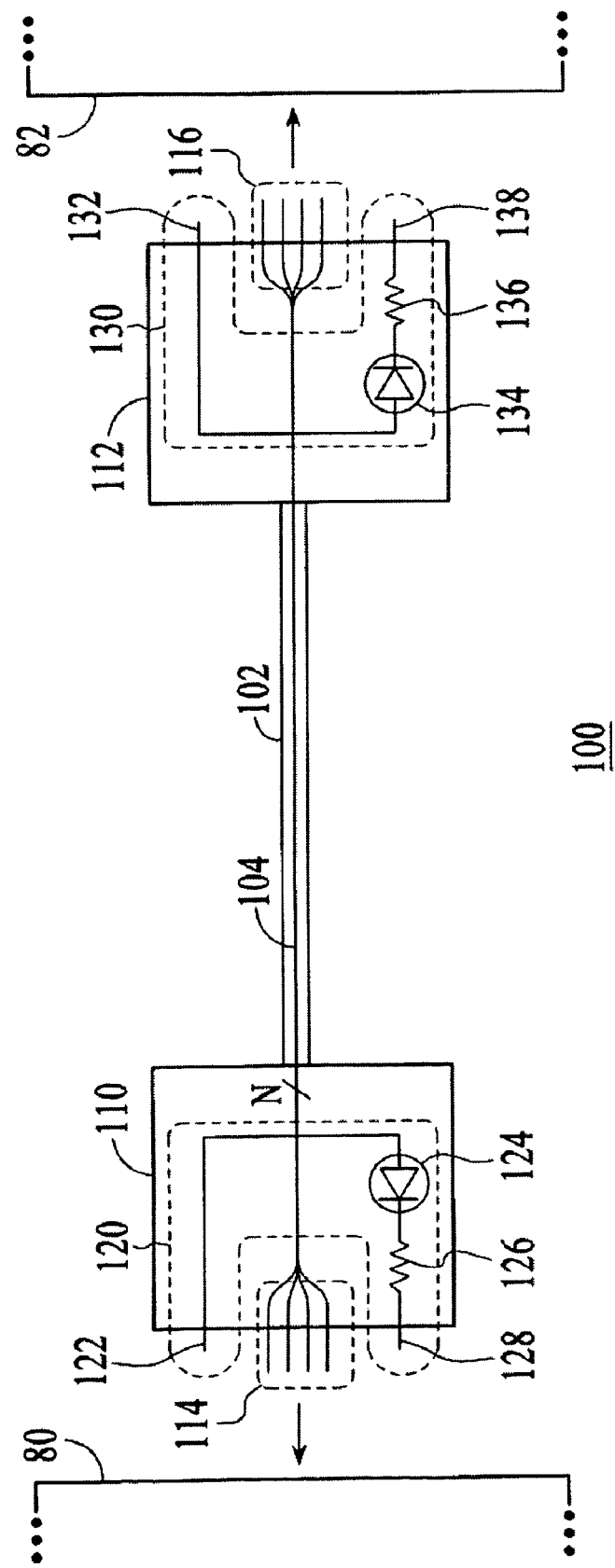
FIG. 2 is a block diagram of a cable system in accordance with the present invention.

FIG. 2 is a block diagram of a cable system 100 in accordance with the present invention. The cable system 100 includes a cable 102, a paddle card 110 coupled to one end of the cable 102, and a paddle card 112 coupled to the other end of the cable 102. The cable 102 includes a flexible wire or bundle of N wires 104. One or more connection pins 114 are coupled to one end of the wires 104, and one or more connection pins 116 are coupled to the other end of the wires 104. As such, the connection pins 114 and 116 connect the cable (i.e. the wires 104) to the server system nodes 80 and 82 when the paddle cards 110 and 112 are plugged into the server system nodes 80 and 82 and the paddle cards 110 and 112 are properly seated.

According the present invention, an LED circuit 120 is coupled to the paddle card 110. The LED circuit 120 includes a voltage pin 122, an LED 124, a resistor 126, and a ground pin 128. Similarly, an LED circuit 130 is coupled to the paddle card 112. The LED circuit 130 includes a voltage pin 132, an LED 134, a resistor 136, and a ground pin 138. In a specific embodiment, the voltage at the voltage pins 122 and 132 is 3.3V. However, the voltage at the voltage pins 122 and 132 may vary and the specific voltage will depend on the specific application. The server system nodes 80 and 82 supply power to the LED circuits 120 and 130 when the paddle cards 110 and 112 are plugged into the server system nodes 80 and 82 and properly seated.

In accordance with the present invention, the voltage pins 122 and 132 and the ground pins 128 and 138 are shorter than the connection pins 114 and 116. As such, when the paddle cards 110 and 112 are plugged into the respective server system nodes 80 and 82, the connection pins 114 and 116 will make proper electrical contact with the server system nodes 80 and 82 before the voltage pins 122 and 132 and the ground pins 128 and 138 make proper electrical contact with the server system nodes 80 and 82. Accordingly, if the voltage pins 122 and 132 and the ground pins 128 and 138 are making proper electrical contact, the server system nodes 80 and 82 will also be making proper electrical contact since they are longer. Hence, the LEDs 124 and 134 being in an "on" state accurately indicate that the paddle cards 110 and 112 are properly seated (i.e. the connection pins 114 and 116 have proper electrical connections with the respective server system nodes 80 and 82).

In a specific embodiment, the connection pins 114 are positioned between the voltage pin 122 and the ground pin 128, and the connection pins 116 are positioned between the voltage pin 132 and the ground pin 138. Also, the voltage pins 122 and 132 are positioned substantially apart from the ground pins 128 and 138 such that the voltage pins 122 and 132 are positioned on one end of their respective paddle cards 110 and 112, and the ground pins 128 and 138 are positioned on the other end of the paddle cards 110 and 112. Such positioning further increases the accuracy of the LEDs 124 and 134 indicating that the paddle cards 110 and 112 are properly seated, because both ends of the paddle cards 110 and 112 need to be properly seated before the LEDs 124 and 134 turn on.

Figure 3:
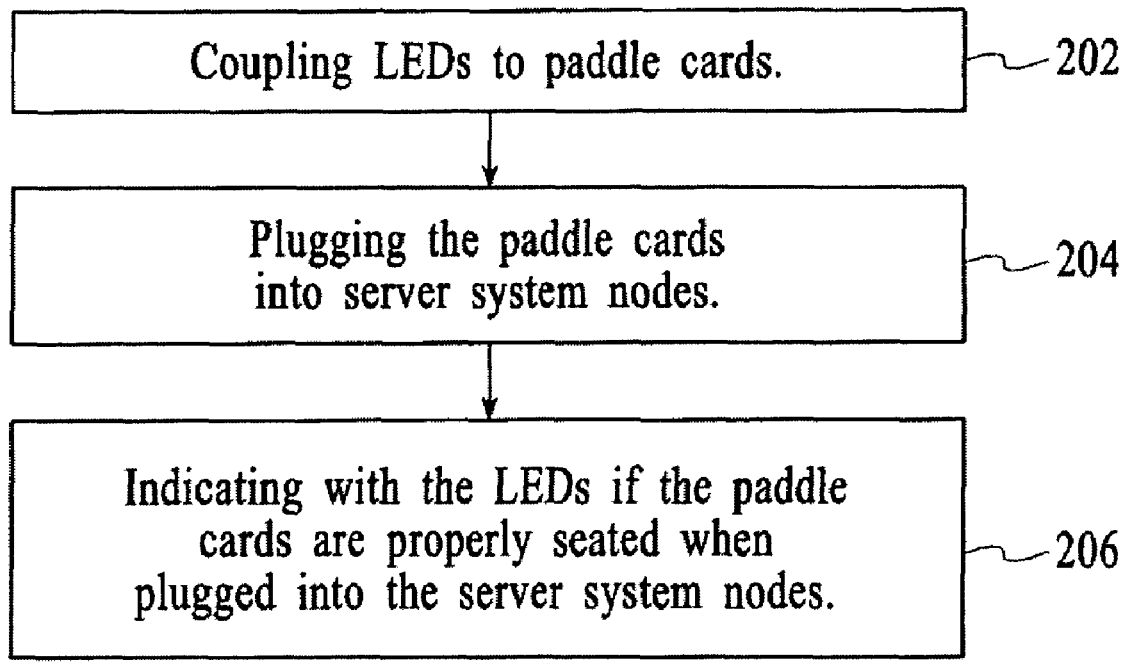
FIG. 3 is a flow chart showing a method for implementing the cable system of FIG. 2 in accordance with the present invention.

FIG. 3 is a flow chart showing a method for implementing the cable system of FIG. 2 in accordance with the present invention. Referring to both FIGS. 2 and 3 together, the LEDs 124 and 134 are coupled to the paddle cards 110 and 112, in a step 202. Next, the paddle cards 110 and 112 are plugged into the server system nodes 80 and 82, in a step 204. Next, the LEDs 124 and 134 indicated if the paddle cards 110 and 112 are properly seated when plugged into the server system nodes 80 and 82, in a step 206.

According to the system and method disclosed herein, the present invention provides numerous benefits. For example, it ensures that the paddle cards of a cable system are properly seated when plugged into server system nodes of a server system.

A system and method in accordance with the present invention for determining if a paddle card is properly seated in a server system has been disclosed. The system provides a paddle card coupled to one end of a cable and a paddle card coupled to the other end of the cable. The paddle cards are coupled to light emitting diodes (LEDs) that light up to indicate that the paddle cards are properly seated in a server system. As a result, errors due to the paddle cards being improperly seated are minimized.

The present invention has been described in accordance with the embodiments shown. One of ordinary skill in the art will readily recognize that there could be variations to the embodiments, and that any variations would be within the spirit and scope of the present invention. For example, although the paddle cards 110 and 112 shown in FIG. 2 are coupled to male connectors, one of ordinary skill in the art will readily realize that the paddle cards may also be configured to couple to female connectors and still remain within the spirit and scope of the present invention. Accordingly, many modifications may be made by one of ordinary skill in the art without departing from the spirit and scope of the appended claims.

What is claimed is:

1. A paddle card system comprising:
   a card; and
   a circuit coupled to the card and configured to couple to a server system node, wherein the circuit comprises a voltage pin, a ground pin, and a plurality of connection pins configured to couple a cable to a server system node, wherein the voltage pin and the ground pin are shorter than the plurality of connection pins, and wherein the circuit indicates when the card is properly seated when the card is plugged into the server system node.

2. The paddle card system of claim 1 wherein the circuit further comprises:
   a light emitting diode (LED) coupled to the voltage pin;
   a resistor coupled to the LED; and
   a resistor coupled to the ground pin, wherein the LED turns on when the voltage pin and the ground pin make electrical contact with the server system node.

3. The paddle card system of claim 2 wherein the plurality of connection pins is positioned between the voltage pin and the ground pin.

4. The paddle card system of claim 2 wherein the voltage pin is positioned substantially apart from the ground pin.

5. The paddle card system of claim 4 wherein the voltage pin is positioned on one end of the card and the ground pin is positioned on the other end of the card.

6. A paddle card system comprising:
   a card;
   a plurality of connection pins coupled to the card and configured to couple a cable to a server system node; and
   a circuit coupled to the card and configured to couple to the server system, wherein the circuit comprises:
   a voltage pin;
   a light emitting diode (LED) coupled to the voltage pin;
   a resistor coupled to the LED; and
   a ground pin coupled to the resistor, wherein the voltage pin and the ground pin are shorter than the plurality of connection pins, and wherein the LED turns on when the voltage pin and the ground pin make electrical contact with the server system node.

7. A cable system comprising:
   a cable;
   at least one paddle card system coupled to one end of the cable, wherein the at least one paddle card system comprises:
   a card;
   a plurality of connection pins coupled to the card and configured to couple a cable to a server system node; and
   a circuit coupled to the card and configured to couple to the server system, wherein the circuit comprises a voltage pin, a ground pin, and a plurality of connection pins configured to couple a cable to a server system node, wherein the voltage pin and the ground pin are shorter than the plurality of connection pins, and wherein the circuit indicates when the at least one paddle card system is properly seated when plugged into the server system node.

8. The system of claim 7 wherein the circuit comprises:
   a light emitting diode (LED) coupled to the voltage pin;
   a resistor coupled to the LED; and
   a resistor coupled to the ground pin, wherein the LED turns on when the voltage pin and the ground pin make electrical contact with the server system node.

9. The system of claim 7 wherein the plurality of connection pins is positioned between the voltage pin and the ground pin.

10. The system of claim 7 wherein the voltage pin is positioned substantially apart from the ground pin.

11. The system of claim 10 wherein the voltage pin is positioned on one end of the card and the ground pin is positioned on the other end of the card.

12. A method for implementing a cable system, the method comprising: plugging at least one paddle card into a server system node;

providing a circuit coupled to the card and configured to couple to a server system node, wherein the circuit comprises a voltage pin, a ground pin, and a plurality of connection pins configured to couple a cable to a server system node, wherein the voltage pin and the ground pin are shorter than the plurality of connection pins, and indicating if the at least one paddle card is properly seated when plugged into the server system node.

13. The method of claim 12 further comprising an LED circuit having an LED, wherein the LED turns on when the paddle card is properly seated when plugged into the system node.

\* \* \* \* \*